Nov. 14, 1967    F. H. VIVIAN    3,352,374
TRAILER TRACTOR
Filed Oct. 18, 1965    4 Sheets-Sheet 1

INVENTOR.
FRANK H. VIVIAN
BY
Fishburn and Gold
ATTORNEYS

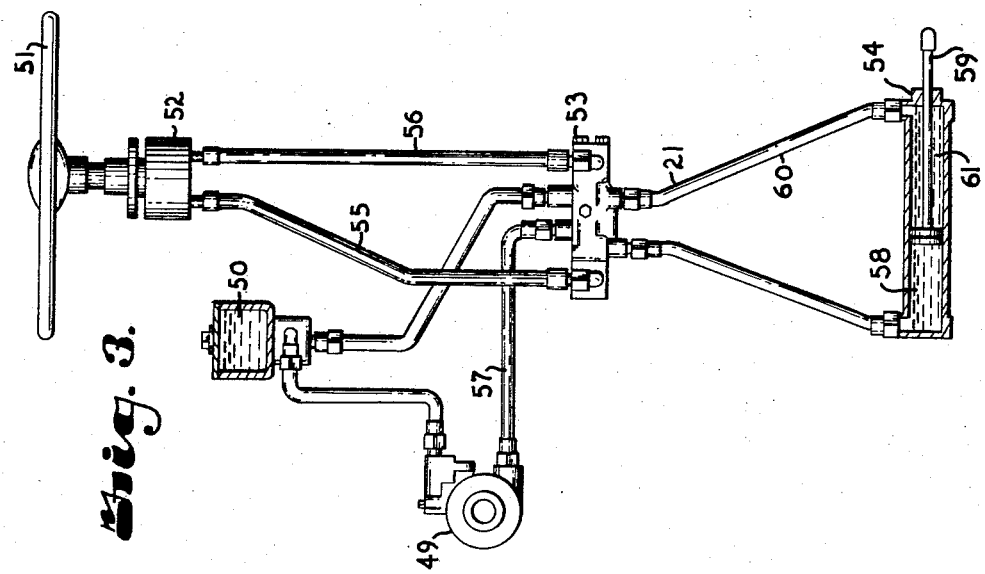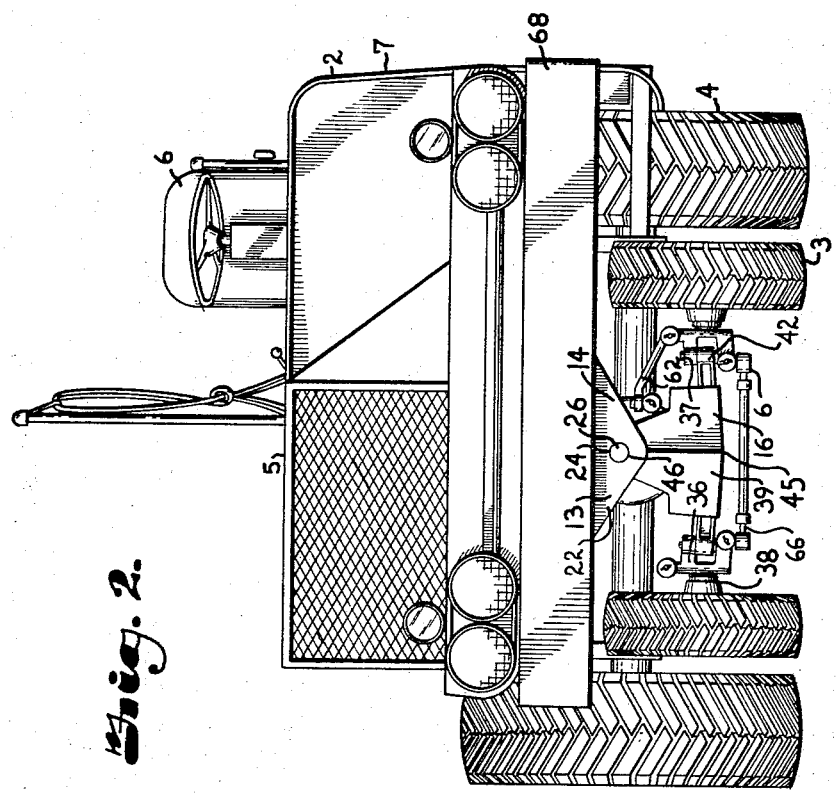

Nov. 14, 1967     F. H. VIVIAN     3,352,374
TRAILER TRACTOR

Filed Oct. 18, 1965     4 Sheets-Sheet 3

INVENTOR.
FRANK H. VIVIAN
BY Fishburn and Gold
ATTORNEYS

Nov. 14, 1967  F. H. VIVIAN  3,352,374
TRAILER TRACTOR
Filed Oct. 18, 1965  4 Sheets-Sheet 4
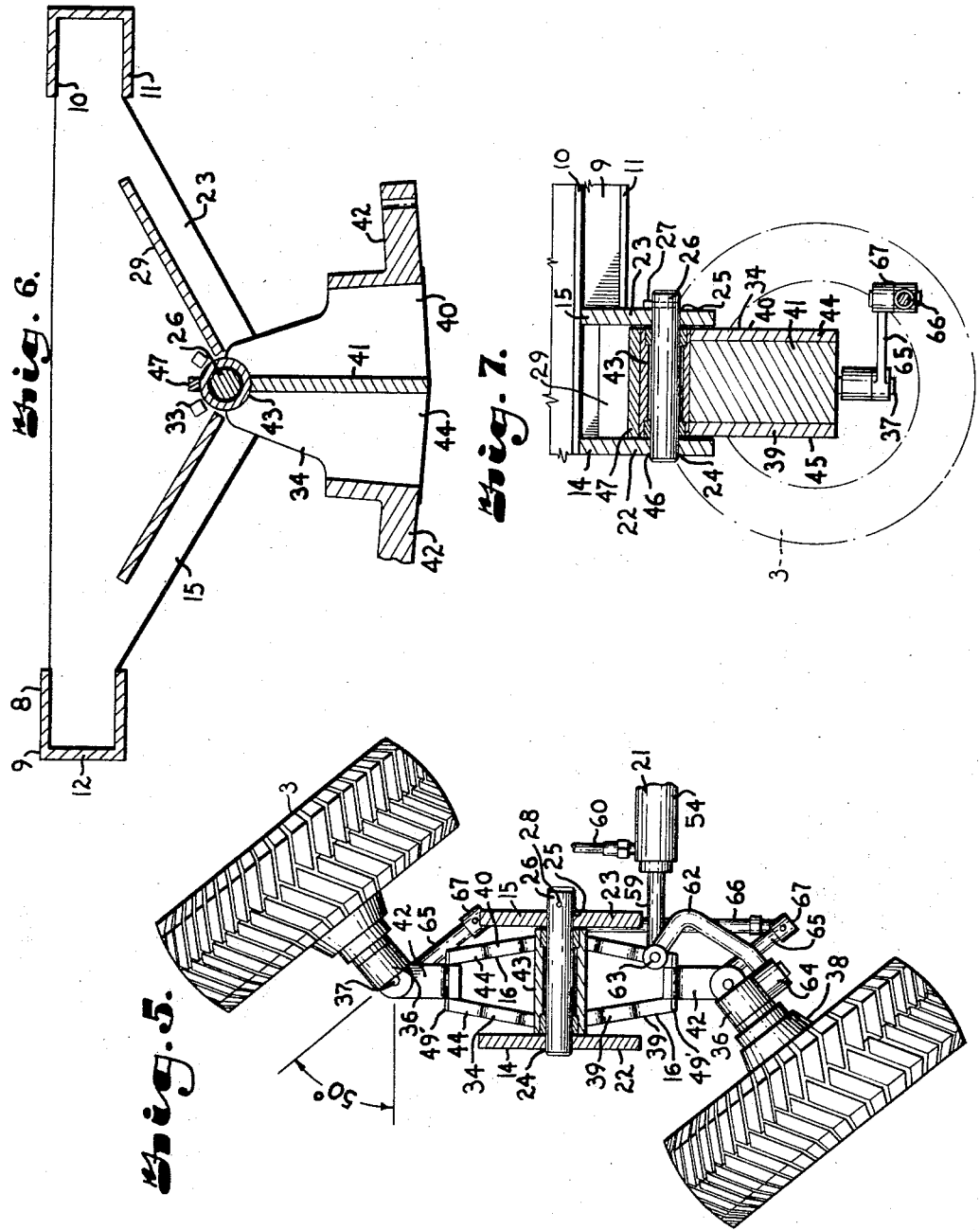
INVENTOR.
FRANK H. VIVIAN
BY Fishburn and Gold
ATTORNEYS United States Patent Office 3,352,374
Patented Nov. 14, 1967

3,352,374
TRAILER TRACTOR
Frank H. Vivian, Ottawa, Kans., assignor to Ottawa Steel
Products, Ottawa, Kans., a corporation of Kansas
Filed Oct. 18, 1965, Ser. No. 497,010
1 Claim. (Cl. 180—79.2)

ABSTRACT OF THE DISCLOSURE

A fifth wheel type tractor for use in terminal areas and yards for moving and maneuvering semi-trailers therein. The tractor having a mobile frame with an engine operatively and selectively connectable to traction wheels for moving the tractor. The tractor has a front member rockable about a longitudinal axis and having wheels rotatable on spindles pivotally carried on king pins carried by the front member and adapted for turning movement through 50 degrees from a straight forward position providing a very short turning radius for the tractor, the front wheels protruding from the vehicle and having less spacing than the rear wheels to reduce the area for maneuvering the tractor unit. The operator and power unit are positioned for visibility of the operator to all areas of the tractors. The steering of the front wheels is by a full power system through a hydraulic ram and connection to the front wheel mountings.

In the trucking industry, it is customary to disconnect the semi-trailer from the highway tractor unit in the truck yard to free the tractor unit for additional highway utilization and also, because the over the highway tractor unit is large and incapable of moving in small areas such as may be encountered in the dock and yard areas. It is, therefore, desirable that different tractor units be employed for maneuvering the semi-trailers in the trucking yard for loading and unloading operations. As the yard and dock facilities of most trucking or shipping firms are extremely limited in space, the use of large or conventional tractor units for maneuvering the semi-trailers within the yard is time consuming resulting in shipment delays and expense.

It is, therefore, the principal objects of this invention to provide a highly maneuverable tractor unit for towing and maneuvering semi-trailers and thereby eliminate the aforementioned difficulties; to provide such a tractor unit which is capable of operating in extremely limited space; to provide such a tractor unit with a relatively small turning radius and one which requires a minimum of turning space; to provide such a tractor unit whose front wheels may be turned in the nature of 50 degrees from the straight forward position requiring only an area of a 35-foot diameter circle for a complete turn; to provide such a tractor unit whose front wheels protrude from the front of the vehicle eliminating a front overhang and whose front wheels are spaced apart substantially less than the spacing of the pair of rear wheels to thereby reduce the area required for maneuvering the tractor unit; to provide such a tractor unit having a fifth wheel, power plant and operator station so arranged as to provide a stable unit of minimum length; to further provide such a tractor unit wherein the operator is so situated on the unit as to have increased visibility as to all areas of the tractor unit to thereby reduce damage to said units and other units within the truck yard; to provide such a tractor unit which is economical to manufacture and efficient in operation for moving and positioning semi-trailers.

Other objects and advantages of this invention will become apparent from the following description taken in connection with the accompanying drawings wherein are set forth by way of illustration and example certain embodiments of this invention.

FIG. 2 is a front elevation of the tractor unit.

FIG. 3 is a diagrammatic view with a full power steering system utilized in the tractor unit.

FIG. 5 is a cross-sectional view through the axle frame also showing the steering mechanism with the wheels of the vehicle in a 50-degree turn.

FIG. 6 is a vertical cross-sectional view through the front axle assembly.

FIG. 7 is a vertical cross-sectional view through the pivot pin of the front axle frame.

Figure 1:
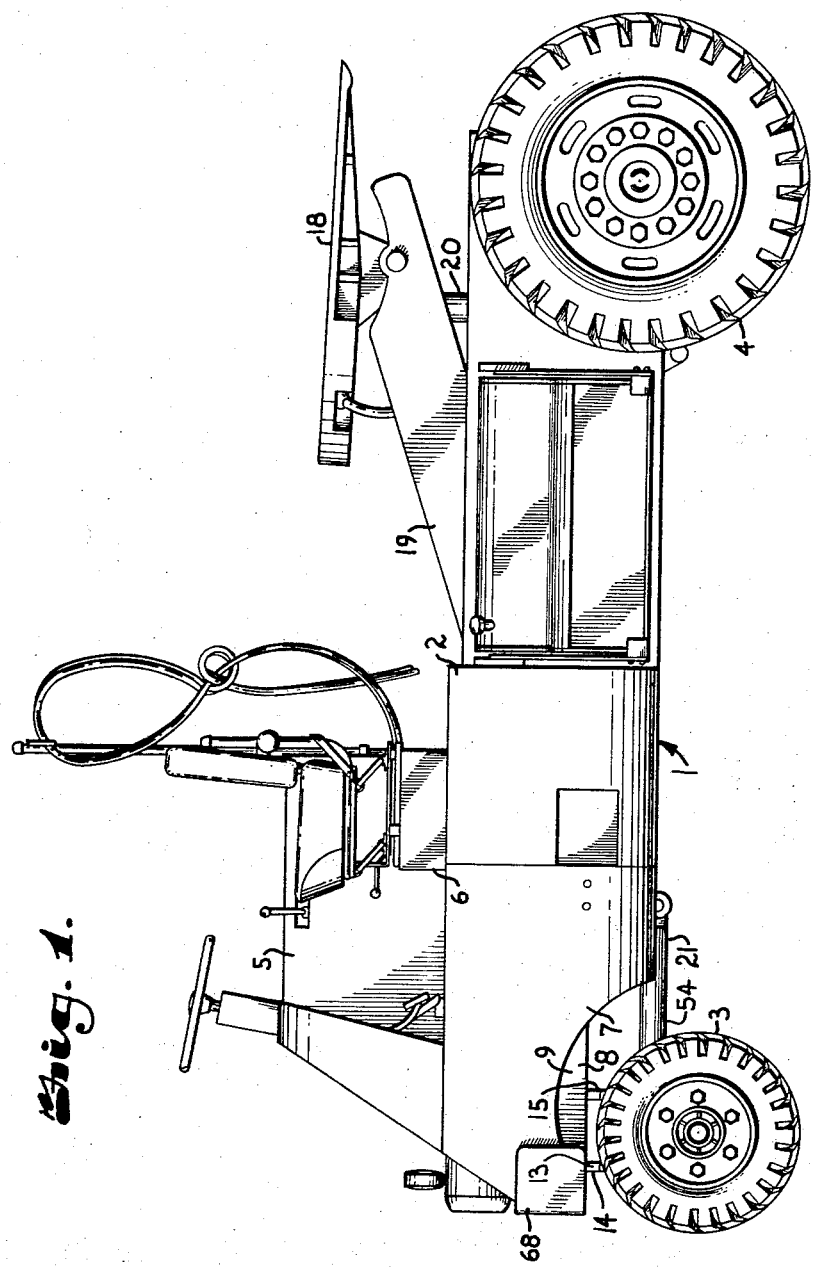
FIG. 1 is a side elevation of a tractor unit embodying the features of this invention.

Referring to the drawings in more detail:

The reference numeral 1 generally designates a mobile tractor vehicle for moving and positioning semi-trailers in freight and cargo handling areas and embodying the features of this invention. The vehicle 1 preferably includes a chassis 2 supported on a pair of front wheels 3 and a pair of rear wheels 4. An engine is located within a housing 5 and has suitable driving connection with the rear wheels 4 for propelling the vehicle, the front wheels 3 being steered for turning. The vehicle 1 has an operator station 6 located at the front portion 7 of the chassis 2 alongside the housing 5. The operator station 6 contains suitable controls positioned therein to control both the operation of the vehicle and the equipment carried thereon.

The chassis 2 includes a vehicular frame 8 having laterally spaced longitudinally extending side frame members 9, preferably in the form of channels having upper and lower flanges 10 and 11 respectively extending inwardly from a web portion 12. The side frame members 9 are connected by a front transverse frame structure 13 which, as illustrated, is comprised of two cross frame members 14 and 15 welded to the side frame members 9 in the manner shown in FIG. 6 and serving to support a front axle assembly 16 in a manner later discussed. The side frame members 9 are suitably connected at their rear portion to provide a rigid frame structure with a rear axle suitably fixed relative thereto.

A conventional fifth wheel structure 18 is carried on the chassis 2 and is mounted for selective raising and lowering relative to said chassis by means of a boom 19 which is operated by hydraulic cylinders 20 in a conventional manner.

This invention contemplates the utilization of front wheels 3 spaced apart a distance in the nature of three-fourths the spacing between the rear wheels 4 in order to decrease the turning radius of the vehicle 1. It is also contemplated that the front wheels 3 may be turned in an arc in the nature of 50 degrees from the straight forward setting or in other words, are capable of turning an arc of 100 degrees from a full left to a full right turn setting, to thereby provide a relatively small turning radius of 17.5 feet with an arrangement whereby the area required for turning is little, if any more than the same circle. The 50-degree turn of the front wheels 3 is made possible by the utilization of the novel front axle assembly 16 and its connection to a steering assembly 21. It is further contemplated that the front wheels 3 of the vehicle will be so mounted as to protrude from the front of said vehicle, thereby eliminating a front overhang and any increase thereby in the amount of space required for a vehicle turn. It is further contemplated that the operator's station will be located adjacent and laterally of the engine housing enabling utilization of a smaller frame structure and giving the operator a forward vantage point from which to operate the vehicle without increasing the overall length of the vehicle and thereby facilitating the maneuverability of said vehicle and reducing the space required for the operation of said vehicle.

Each of two cross frame members 14 and 15 contain a mounting portion 22 and 23 respectively which extends downwardly from the plan of the vehicular frame 8 and have aligned openings 24 and 25 with their axis parallel to and in the same vertical plane with the center line of the vehicular frame 8. A mounting pin 26 on which the axle assembly 16 is swingably mounted has end portions mounted in said openings 24 and 25 and is secured to cross frame member 15 by means of a stud 27 that engages in an opening 28. The frame members 14 and 15 each have laterally spaced abutments such as blocks 33 mounted thereto adjacent the openings 24 and 25 which cooperate with the axle assembly 16 to limit the rotation or swing of the axle assembly relative to the mounting pin 26 and the vehicular frame 8 in a manner discussed later. The frame members 14 and 15 also have reinforcing plates 29 extending therebetween to reinforce said frame members 14 and 15.

The axle assembly 16 is comprised of an axle frame 34, a pair of yokes 36, each of which are mounted to said axle frame 34 by a king pin 37, a hub and axle stub assembly 38.

Figure 4:
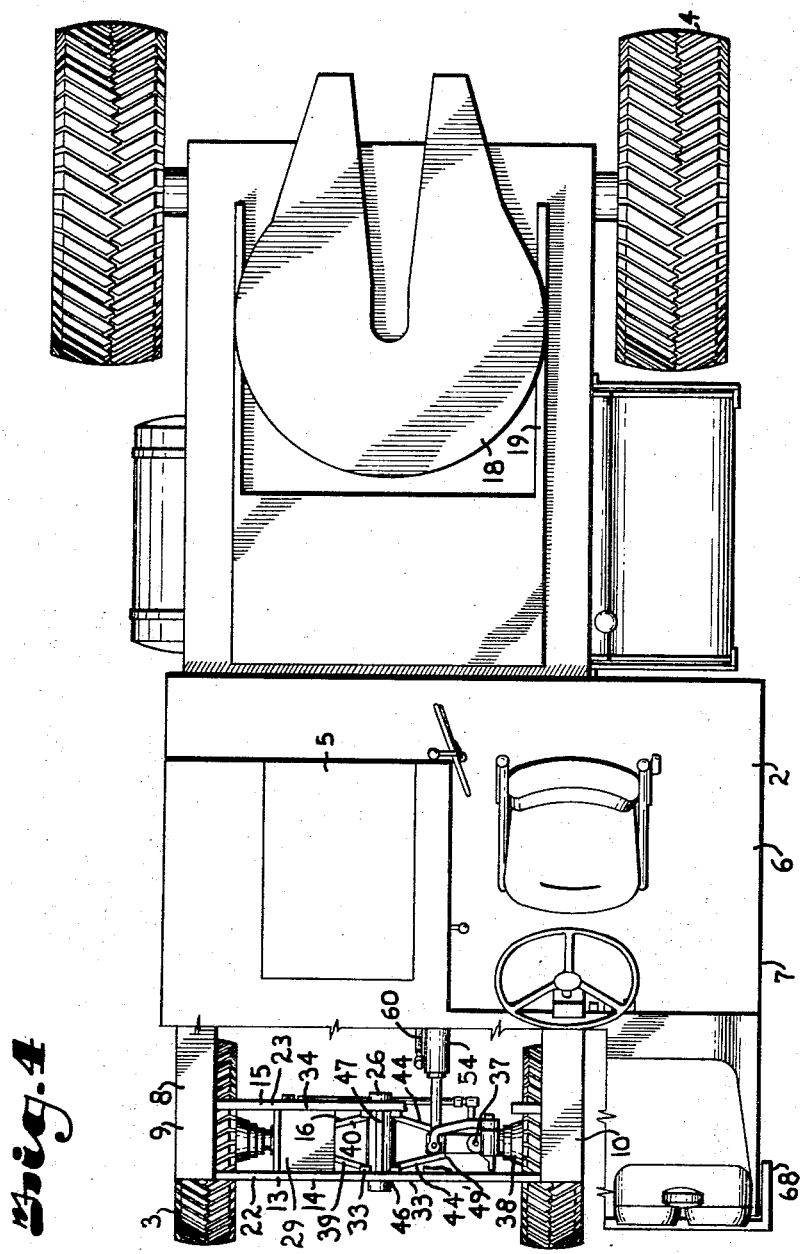
FIG. 4 is a top view of the tractor unit with the front portion of said unit broken away to show the front axle assembly and the steering mechanism.

The axle frame 34, as illustrated, is comprised of two axle stiffeners 39 and 40, a central rib 41, a pair of axle extensions 42 and a bearing assembly 43. The stiffeners 39 and 40 are generally V-shaped, as shown in FIGS. 4 and 5, and each consist of two sections 44 joined at a center apex 45 which extend outwardly in a diverging relation to one another. As shown in FIG. 7, stiffeners 39 and 40 are employed in opposed spaced relation to one another with rib 41 extending between said stiffeners 39 and 40. The respective sections 44 of each of the stiffeners 39 and 40 converge on the section 44 of the opposite stiffener as said sections 44 extend outwardly toward the axle extensions 42.

The axle frame has a bearing assembly 43 mounted on stiffeners 39 and 40 which defines opening 46 through which the mounting pin 26 is extended to secure the axle frame 34 to the cross frame members 14 and 15 of the vehicular frame 8. The axle frame 34 is therefore free to rotate on pin 26 in a plane transverse of the longitudinal vehicular frame 8 and the bearings of bearing assembly 43. The bearing assembly 43 has a reinforcing member 47 extending along its upper edge to reinforce the bearing assembly 43 and also to cooperate with blocks 33 to thereby act as a stop means to limit the rotation of the axle frame 34 on the mounting pin 26.

By mounting the axle frame 34 to the vehicular frame 8 in the manner previously described, the axle assembly 16 will be caused to rotate or swing when the front wheels 3 encounter an irregularity in the roadway surface within a reasonable arc as defined by the stop members 33 on the cross frame members 14 and 15. Such a mounting eliminates the necessity of springs or shock absorbers in a vehicle of this type, thus conserving space between the front wheels so that said front wheels 3 may be moved closer together and the axle assembly may be so constructed as to avoid interference with the 50-degree turn of the front wheels to thereby facilitate the reduction of the turning radius.

The converging end portions 49' of stiffeners 39 and 40 each have an axle extension member 42 extending outwardly from said stiffeners 39 and 40. The king pin 37 and yoke 36 are mounted on the extension member 42 in a conventional manner. The hub and stub axle assembly 38 mounted upon yoke 36 are extended outwardly by increasing the length of the hub assembly 38 in order to prevent interference between the wheels 3 when the 50-degree turn and the axle assembly or parts of the steering mechanism 21. The spacing between the king pin 37 and the center line of its associated wheel 3 is equal to approximately one-half the spacing between the king pins at each end of the axle frame 34.

In a vehicle of the type described herein, it is necessary to utilize a steering system which responds quickly to the operator's movement of the steering wheel and which may effect a 50-degree turn without extensive operation of the steering wheel. It is further necessary to design a steering system which does not conflict with the wheels when said wheels are cramped to the full 50-degree turn. Referring to FIG. 3, a full power steering systems 21 is shown which is comprised of a pump 49, a reservoir or tank 50, a steering wheel 51, a control pump 52, a valve 53 and a hydraulic cylinder 54. The operation of steering wheel 51, in turn, operates the pump 52 to increase the hydraulic pressure in either lines 55 or 56 to operate valve 53 in relation to the direction in which the steering wheel 51 is operated. When wheel 51 is operated in a counterclockwise direction, valve 53 is shifted to open line 57 from pump 49 to chamber 58 in the hydraulic pump, thereby forcing cylinder rod 59 outwardly from cylinder 54. When the wheel 51 is turned in the opposite direction, the valve 53 opens a line 60 between the pump 49 and chamber 61 in the hydraulic cylinder 54 to move the cylinder rod 59 in the opposite direction inwardly of the hydraulic cylinder 54. Referring to FIG. 5, arm 62 is mounted on the cylinder rod 59 by a pivotal connection 63 and to yoke 36 by fixed connection 64. Control arm 62 is generally in a right angle configuration in plan view and effects the turning of the left front wheel 3 when the cylinder rod 59 is pushed inwardly and outwardly of the hydraulic cylinder 54. Each of the yokes 36 adjacent the front wheels 3 contains an arm 65 rigidly mounted to the yoke structure 36. A tie rod 66 extends between arms 65 and is connected to said arms 65 by pivotal connections 67. Arm 65 and tie rod 66 cooperate to impart the turning movement of the left front wheel 3 effected by arm 62 and cylinder rod 59 to the right front wheel 3.

The front wheels 3 of vehicle 1 are so situated as to protrude forwardly of the front frame member 13 and bumper 68 which is mounted on the front frame member 13 and extends forwardly approximately six inches. With the wheels so located, a front overhang on the vehicle has been eliminated, thereby reducing the amount of space required in making a turn or maneuvering the vehicle. The vehicle 1 has been further arranged to minimize the longitudinal length of said vehicle by locating the operating station 6 adjacent the engine housing 5 as opposed to placing said operating station 6 in front of or behind the engine housing 5. The operating station 6 overhangs vehicular frame 8 and is mounted thereto by suitable means. By so arranging the various components of the vehicle 1, said vehicle is constructed at its minimum length, thereby facilitating the maneuverability of said vehicle and reducing the space required in which the vehicle must operate.

By insetting the front wheels 3 to a spacing substantially less than that of the rear wheels 4 and by moving said front wheels to a position protruding from the front of the vehicle 1, the area required to turn the vehicle has been greatly reduced from that required for turning of the standard towing vehicle and has reduced the turning radius. The novel front axle assembly has also assisted in providing a 50-degree turn of the front wheels 3 to thereby reduce the turning radius of vehicle 1 from that of standard towing vehicles. All these features of the present invention have combined to produce a highly maneuverable semi-trailer towing vehicle for utilization in areas of extremely limited space.

It is to be understood that while I have illustrated and described one form of my invention, it is not to be limited to the specific form or arrangement of parts herein described and shown except insofar as such limitations are included in the claim.

What I claim and desire to secure by Letters Patent is:

A fifth wheel type tractor for moving semi-trailers having an elongate vehicular frame, a body, a pair of driving wheels, a manually operated steering wheel, and a vehicle steering and wheel mounting mechanism including:
  (a) a transverse frame member having a pair of spaced-apart frame plates adjacent the forward end of said frame and body, a plurality of reinforcing members extending between and secured to the frame plates, a bearing bore in each frame plate with said said openings being horizontal and aligned on an axis parallel to the longitudinal axis of the tractor, and abutment members secured to said frame plates in opposed relation on facing interior surfaces thereof with the abutment members on each side of and in radial relation to the bearing bores and equally spaced from the top thereof;
  (b) an axle assembly removably mounted in vertical spaced relation below and parallel with the transverse frame member and having a pair of horizontally spaced-apart stiffeners in opposed relation and mounted between said spaced-apart stiffeners, a pair of bearings secured in the bearing housing adjacent each end thereof, and a reinforcing rib fixed on the bearing housing between the adjacent interior surfaces of the frame plates and adapted to engage the abutment members in response to pivotal movement of said axle assembly;
  (c) an elongate mounting pin, said pin extending through the bearing bores in each frame plate and through the pair of bearings mounted coaxially in the bearing housing, said mounting pin being retained therein whereby the axle assembly is freely rockable about said mounting pin with the rocking limited by the travel of the reinforcing rib between the respective abutment members on the frame plates, said mounting pin being removable whereby said axle assembly is removable;
  (d) a pair of a horizontal axle assembly extensions each having one end fixedly mounted between opposed ends of the stiffeners and having a vertical bore in the other end thereof, said vertical bores being equally spaced from the mounting pin;
  (e) a pair of stub axles each having a yoke portion with a pair of horizontal arms with aligned coaxial vertical bores in one end thereof;
  (f) a king pin retained in the vertical bores in the horizontal arms of the yoke portion and in the vertical bore in the respective axle assembly extension to pivotally mount the stub axles on the respective axle extension;
  (g) a pair of laterally spaced steerable wheels rotatably mounted on the stub axles, said spaced steerable wheels having a spacing of approximately three-fourths of the spacing of the driving wheels and the spacing between the center of each steerable wheel and the king pin being approximately equal to the spacing between each king pin and the mounting pin, whereby the king pins are positioned approximately at the quarter points of the axle assembly;
  (h) tires mounted on the spaced steerable wheels, said tires extending forwardly beyond the body;
  (i) a power steering means operatively connected to one of the stub axles and having a hydraulic cylinder mounted on the vehicular frame in offset relation to and parallel with the longitudinal axis of the vehicular frame, a cylinder rod operative in the hydraulic cylinder and extending toward said axle assembly, an L-shaped control arm having one end pivotally and removably mounted on the cylinder rod and the other end fixed to one horizontal arm of said one of the stub axles, and a linkage connecting the yoke portions of the respective spaced steerable wheels, said hydraulic cylinder being positioned to be cleared by the tires during maneuvering; and
  (j) a full power steering system having a control pump responsive to manual operation of said steering wheel, a hydraulic valve, a reservoir, and a hydraulic pump operatively connected to said hydraulic cylinder, whereby turning the steering wheel in a first direction turns the spaced steerable wheels in a first direction and turning the steering wheel in a second direction turns the spaced steerable wheels in a second direction.

References Cited

UNITED STATES PATENTS

| | | | |
|---|---|---|---|
| 2,625,232 | 1/1953 | Lado | 180—79.2 |
| 2,945,544 | 7/1960 | Jacobus | 180—79.2 |
| 3,027,963 | 4/1962 | Nicholson | 180—79.2 |
| 3,066,983 | 12/1962 | Bay | 280—425 X |
| 3,254,900 | 6/1966 | Allen | 280—425 X |

BENJAMIN HERSH, *Primary Examiner.*

J. H. BRANNEN, *Assistant Examiner.*